United States Patent
Köck et al.

(10) Patent No.: US 6,335,073 B1
(45) Date of Patent: Jan. 1, 2002

(54) THERMAL SHIELD FOR COMPONENTS MADE OF THERMOPLASTICS

(75) Inventors: Gerhard Köck, Keinberg; Klaus Pfaffelhuber, Günzburg; Stefan Lahner, Krumbach, all of (DE)

(73) Assignee: Faist Automotive GmbH & Co. KG., Krumbach (DE)

( * ) Notice: Subject to any disclaimer, the term of this patent is extended or adjusted under 35 U.S.C. 154(b) by 0 days.

(21) Appl. No.: 09/251,695

(22) Filed: Feb. 17, 1999

(51) Int. Cl.⁷ .............................. B32B 1/04; B27N 9/00
(52) U.S. Cl. .................. 428/68; 428/163; 428/174; 428/458; 428/461; 428/913; 428/920
(58) Field of Search .................. 428/681, 76, 174, 428/458, 474.4, 480, 460, 913, 132, 163, 461, 920

(56) References Cited

U.S. PATENT DOCUMENTS

| | | | |
|---|---|---|---|
| 2,830,001 A | * 4/1958 | Barnes | 428/167 |
| 3,302,358 A | * 2/1967 | Jackson | 428/75 |
| 3,583,123 A | * 6/1971 | Holmgren | 428/167 |
| 3,940,547 A | * 2/1976 | Needham et al. | 428/463 |
| 4,250,223 A | * 2/1981 | Cook | 428/285 |
| 5,656,353 A | * 8/1997 | Butler | 428/133 |

FOREIGN PATENT DOCUMENTS

| | | | |
|---|---|---|---|
| DE | 3721715 A1 | 7/1987 | B32B/15/14 |
| DE | 3922636 C1 | 7/1989 | F16L/59/02 |
| DE | 4036261 A1 | 11/1990 | B60R/13/08 |
| EP | 0305649 A2 | 3/1989 | B29C/67/18 |
| EP | 0516290 A1 | 12/1992 | B29C/67/18 |
| EP | 0751044 A1 | 1/1997 | B60R/13/08 |

OTHER PUBLICATIONS

Römpp Chemie Lexikon, p. 4570–4571 (1) No Date.
English–language translations or portions of DE 37 21 715 A1, DE 39 22 636 C1, DE 40 36 261 A1, EP 0 305 649 A2, and Römpp, No Date.
Information on U.S. Patent equivalent to German patent document DE 40 36 261 A1, Nerac.com (Jun. 20, 2001).
English–language abstract of EP 0 305 649 A2, Nerac.com (Jun. 20, 2001).

* cited by examiner

*Primary Examiner*—Donald J. Loney
(74) *Attorney, Agent, or Firm*—Hopgood, Calimafde, Judlowe & Mondolino, LLP

(57) ABSTRACT

In a thermal shield for components made of thermoplastics, for the automotive industry in particular, an aluminium layer 2 is connected with the component to be protected, which serves as a carrier 1 for the thermal shield H, by means of a thermoplastic coating 3 in the region of the heat source. It is recommended to dispose the thermal shield H not only in the immediate region of heat source 4, but also, on the component, in the area up to a lateral spacing B from the heat source that the aluminium layer 2 may dissipate heat outwardly, i.e. outwardly from the region of thermal shield 4 to a cooler region.

4 Claims, 2 Drawing Sheets

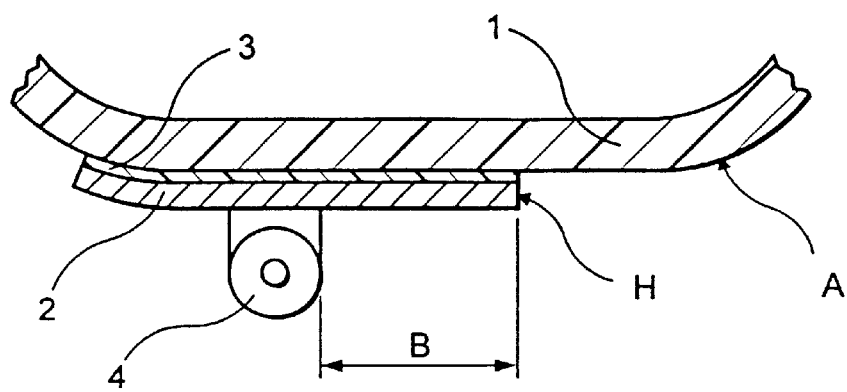
F I G. 1
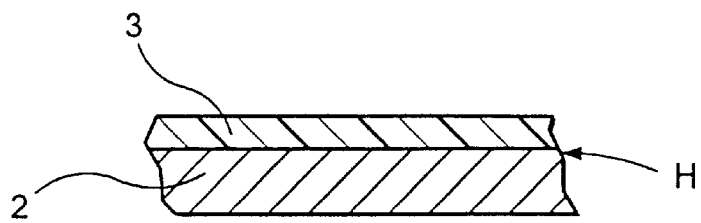
F I G. 2
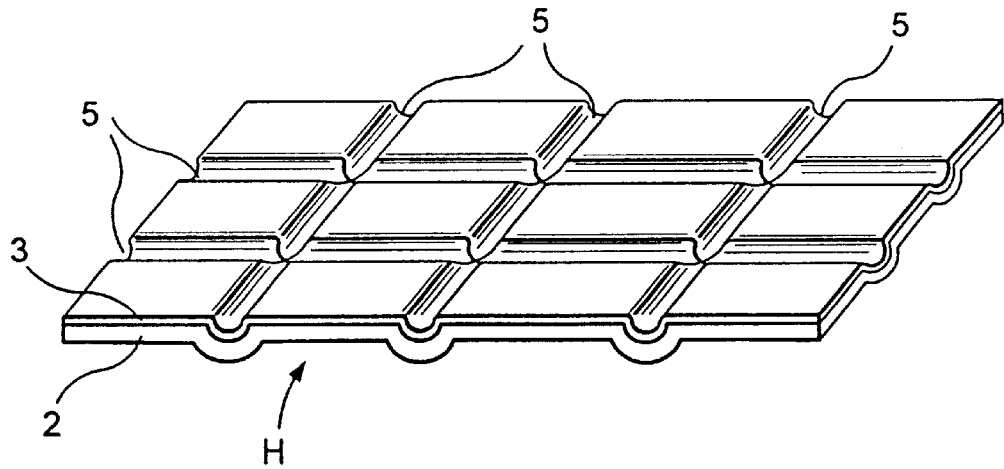
F I G. 3

THERMAL SHIELD FOR COMPONENTS MADE OF THERMOPLASTICS

BACKGROUND OF THE INVENTION

The invention relates to the shield of components made of thermoplastics in particular against such heating which might result in damages to the component, mechanical damages in particular.

A thermal shield for thermoplastic components has already been known, which consists of a thermally insulating mat which is not damaged even by the influence of the heat source, but prevents high temperatures from being dissipated towards the component to be protected. Such a thermally insulating mat is attached to the component by fasteners, for instance. If GMT carrier parts are used as components, they become too soft at temperatures exceeding 140° C. It is very expensive and not too efficient to clip or fix aluminium sheet by riveting. If underbody coverings for motor vehicles are produced from the polycondensation product SMC, i.e. a polyester resin, and are protected against too great heating by the heat source like an exhaust silencer, for instance, different problems arise.

BRIEF STATEMENT OF THE INVENTION

It is the object underlying the invention to provide a thermal shield or, respectively, a heat-proof component equipped therewith which is easy to manufacture, is as light-weight as possible, has not too great spatial dimensions and provides for a good thermal screening effect. Moreover, it is desired to use such materials which may be reused or disposed of in an environmentally friendly manner at low expenditure when the respective components are recycled, and to renounce the use of SMC materials.

The invention is claimed in claims 1 and 10 as well as in claim 13 in respect of the process for the manufacture thereof. Preferred embodiments may be taken from the subclaims and the following specification in conjunction with the drawing.

The principle for meeting this object in accordance with the invention consists in that an aluminium layer having a thermoplastic coating acts as a thermal shield in that the thermal shield serves as a connecting member to the structural unit which is to be protected and also consists of thermoplastic material on the outside. The thermoplastic coating connects with the thermoplastic material of the component to be protected via fusing, in particular, so that the thermal shield may very easily and quickly be attached to the outside of the component in situ, in particular. Such components are, for instance, underbody coverings for motor vehicles, which are to be protected against heat in the region of the exhaust silencer and the corresponding exhaust pipes, as well as engine compartment coverings. The invention also makes it possible that the thermal shield may be attached at the exact place. In contrast to expectations saying that a good heat-conducting material like aluminium may in any event not be used as a good thermal shield where thermoplastic layers instead of screws, clamps or the like are used as connecting elements since aluminium precisely leads the heat very well and quickly to the thermoplastic material of the "connecting layer", it was surprisingly observed that the opposite is true. Thus, there was no softening with a risk of the aluminium layer of components being detached in one embodiment, wherein polypropylene is used as a thermoplastic layer even if the aluminium side was heated to 160° C. for one hour. It is assumed that the major part of the heat is dissipated by the aluminium, but is not dissipated to the thermoplastic material on the opposite side of the aluminium layer, but into the free, cooler space at a spacing from the heat source. In this respect, the aluminium layer no longer acts as a "heat concentrator", but as a cooling member. It is therefore not only recommended to dispose the thermal shield in the immediate vicinity of the heat source, but to expand it slightly further into the low-temperature environment. It is also possible and useful, if need be, to structure the aluminium layer outside the actual heat region such that webs, which are more particularly free of lesser heat-conducting coatings, promote the cooling effect.

The aluminium layer should have a thickness between 20 $\mu$m and 3 mm, more particularly between 0.08 and 0.2 mm. It is more particularly configured as a broad ribbon with a width of more than 10 cm. Both for the above-mentioned reasons in respect of cooling and for improving the mechanical stability, the aluminium layer may also be provided with web-shaped elevations and/or depressions and/or puncti-form or, respectively, circular elevations.

The object is also met by an aluminium layer being structured to be net-shaped such that it is sufficiently self-supporting if no aluminium wires being too thin are used. Expanded aluminium metal in conjunction with the thermoplastic coating for instance meets the object underlying the invention.

The thermoplastic coating should consist of a polymerisation product like polypropylene, in particular, which behaves in a part-crystalline manner in the usual temperature ranges. This material is recommended above all when the component to be protected substantially consists of the same material too. Such a material may well be disposed of and also be reused, which is also true for aluminium. In this respect, superordinate economic and ecological requirements are also met. Polyester (PET), polyamide (PA) and thermoplastic polyurethane (TPU) are also suitable.

The thermoplastic coating should have a layer thickness between 10 pm and 5 mm, more particularly between 0.04 and 0.1 mm. The coating should have about half the thickness of the aluminium layer.

The principle according to the invention may not only be applied to the thermal shield as such, but to an aggregate wherein the thermal shield is combined to one structural unit together with the component to be protected. In this configuration of the invention, the thermal shield equally consists of an aluminium layer; this layer is connected with the carrier via a thermoplastic layer, the thermoplastic layer fusing with the thermoplastic material of the carrier.

The thermal shield is more particularly manufactured in that a thermoplastic coating is applied to the aluminium layer having a ribbon-shaped, a net-shaped or any other structure.

The aluminium layer is generally previously provided with the thermoplastic layer and then attached to the component.

A particularly favourable manufacturing process for a heat-proof component consists in that the aluminium layer is heated, via heat contact in particular, to a sufficiently high temperature which suffices for that a thermoplastic layer, which is pushed or, respectively, inserted or applied in a different manner between the aluminium layer and the component to be protected, connects, during pressing-on to the outside of the component by means of the aluminium layer, with said component and thereby sufficiently anchors the aluminium layer. In case an aluminium layer, which is smooth on the outside, does not meet these requirements, it is recommended to provide the layer with depressions and elevations by stamping, whereby the interface between the aluminium layer and the thermoplastic layer is enlarged and the adhesive forces are increased.

According to a further configuration of the invention, it is possible to provide web-like elevations on the component or, respectively, on a carrier part to be inserted between an additional intermediate component and the thermal shield, to which the thermal shield is fused, welded or glued if enough space is available. This achieves an additional sound-insulating or sound-absorbing effect and also improves the acoustically absorbing efficiency of the heat-proof component. This is above all useful for engine compartment coverings being configured as engine enclosures.

BRIEF DESCRIPTION OF THE DRAWINGS

In the following, the invention will further be explained from the drawing. Therein:

FIG. 1 shows a part-section of an underbody covering as the component to be protected against too strong heating in the region of an exhaust silencer;

FIG. 2 shows an enlarged part-section of the thermal shield according to the invention;

FIG. 3 shows a schematic plan view of the thermal shield according to the invention.

DETAILED DESCRIPTION

Figure 4:
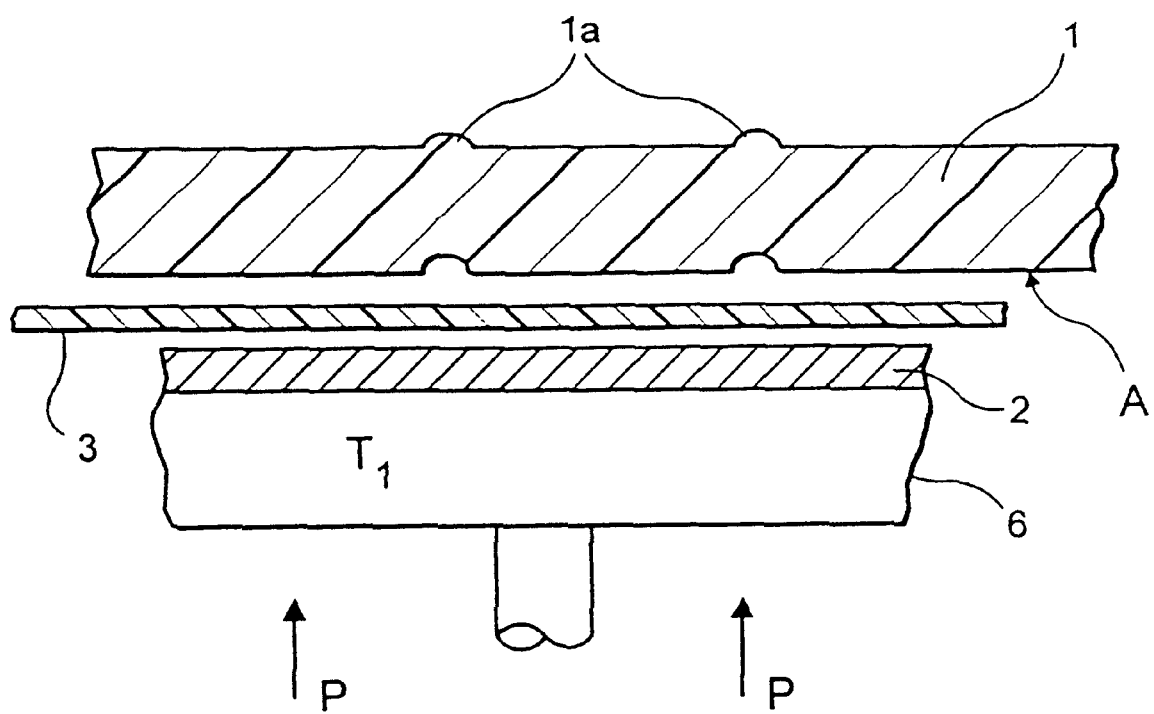
FIG. 4 is a schematic representation (part-section) of a preferred manufacturing process for a heat-proof component according to the invention.

In the embodiment of FIG. 1, the thermal shield H is attached to the outside A of the underbody covering of a motor vehicle. Here the underbody covering consists of polypropylene and constitutes the component to be protected against too strong heating and, accordingly, the carrier 1 for the thermal shield H. If no thermal shield is provided, carrier 1 is heated very strongly in the region of exhaust silencer 4 during motor vehicle operation unless exhaust silencer 4 is suspended at a very large spacing from the underbody covering. In order to keep this spacing low, the thermal shield H according to the invention is inserted between exhaust silencer 4 and carrier 1, the shield consisting of aluminium layer 2 facing exhaust silencer 4 on the one hand and of thermoplastic coating 3 facing carrier 1 on the other hand. This thermal shield H is more particularly connected with the thermoplastic material of carrier 1 via fusing. In the case of fusing, it is recommended to use polypropylene for the thermoplastic coating as well. This avoids the use of too many different materials, which would result in problems with the disposal thereof. Incidentally, FIG. 1 makes it clear that the heat shield H is not fastened to the carrier 1 in the immediate region between carrier 1 and exhaust silencer 4 only, but extends into the area that is delimited by the lateral spacing B between the exhaust silencer 4 and the edge of the thermal shield H. This substantially improves the heat-dissipating, i.e. the cooling function of aluminium layer 2, which is exposed outwardly, towards cooler regions of outside A.

In the embodiment of FIG. 2, the aluminium layer 2 is manufactured from an aluminium ribbon having a thickness of 0.1 mm and a thermoplastic coating of polypropylene having a thickness of 0.05 mm.

According to FIG. 3, the heat shield H is not only expanded in a flat plane; rather, groove-like depressions 5, which run orthogonally towards each other, extend on the side to face the carrier 1 and corresponding elevations extend on the opposite side. This not only improves the stability of thermal shield H, but also its cooling effect.

The invention further offers the following advantage: due to the self-supporting structure and, consequently, the bearing function of the thermal shield 4 according to the invention, the component to be protected itself need not be dimensioned to be correspondingly mechanically stable. Thus, the use of glass fibers in a glass fiber-reinforced plastic may be renounced since the thermal shield according to the invention, aside from the protective function against heating, also improves the stability of the respective component.

According to the special configuration of the process according to the invention represented in FIG. 4, a thermal shield is to be attached on the outside A of carrier 1 which consists of polypropylene and is provided with groove-shaped depressions and elevations 1a. For the purpose, the aluminium layer 2 is put onto a platen 6 which is heated to a temperature $T_1$ which is substantially higher than the softening or, respectively, melting temperature of the thermoplastic material of carrier 1. A film of thermoplastic material, more particularly of the same thermoplastic material as the carrier 1, is inserted between this carrier 1 and the aluminium layer 2 in the form of thermoplastic layer 3. By pushing platen 6 upwardly in the direction of pressure arrows P, the inserted thermoplastic layer 3 is pressed, together with aluminium layer 2, onto the outside A of carrier 1. In the process, the thermoplastic material fuses. After the thermoplastic material of carrier 1 and thermoplastic layer 3 have fused together and after the aluminium layer 2 has been glued on, there results an integrated composite so that the platen 6 may be removed and the aluminium layer 2 remains fixedly connected with carrier 1 and may fulfill its heat-dissipating and, optionally, mechanically stabilising function.

However, the cover element, which consists of aluminium layer 2 provided with the thermoplastic coating 3, is commonly fused onto the component or, respectively, carrier 1 as an integrated composite member. It is useful to heat this prefabricated cover member on a stationary contact heating device which is clearly heated above the melting temperature of the thermoplastic coating and to put it into a pressing mould where carrier 1 has already been provided in order to press them together by means of an upper die so that the adjacent thermoplastic layers fuse together.

What is claimed is:

1. Thermal shield for components made of thermoplastics, wherein a cover member, which protects the component against too strong heating in part at least, is combined with a connecting member to form a structural unit and the connecting member realizes the connection with the component, characterized in that the cover member consists of an aluminium layer (2) which is coated with a thermoplastic coating (3) serving as a connecting member on the side to face the component (1) in part at least, and characterized in that the aluminium layer (2) is provided with web-shaped elevations and depressions (5), respectively.

2. Thermal shield for components made of thermoplastics, wherein a cover member, which protects the component against too strong heating in part at least, is combined with a connecting member to form a structural unit and the connecting member realizes the connection with the component, characterized in that the cover member consists of an aluminum layer (2) which is coated with a thermoplastic coating (3) serving as a connecting member on the side to face the component (1) in part at least and characterized in that the aluminium layer (2) is provided with punctiform or circular elevations.

3. Thermal shield for components made of thermoplastics, wherein a cover member, which protects the component against too strong heating in part at least, is combined with a connecting member to form a structural unit and the connecting member realizes the connection with the component, characterized in that the cover member consists of an aluminium layer (2) which is coated with a thermoplastic coating (3) serving as a connecting member on the side to face the component (1) in part at least, and characterized in that the aluminium layer (2) comprises a net-shaped, self-supporting structure.

4. Heat-proof component, wherein a carrier comprising a thermoplastic material is covered on the outside with a thermal shield in part at least, which thermal shield protects against heat transfer from a heat source (4), characterized in that the thermal shield (H) comprises an aluminium layer (2) and is connected with the carrier (1) via a thermoplastic layer in that the thermoplastic layer is connected with the thermoplastic material of the carrier (1), and characterized in that the thermal shield (H) is connected with the component via ribs forming a web structure, which enables the formation of sound absorbers.

* * * * *